(12) United States Patent
Ishikawa

(10) Patent No.: US 7,724,819 B2
(45) Date of Patent: May 25, 2010

(54) WIRELESS IMAGE TRANSMISSION DEVICE AND IMAGE TRANSMISSION METHOD

(75) Inventor: Yutaka Ishikawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1249 days.

(21) Appl. No.: 10/467,311

(22) PCT Filed: Feb. 4, 2002

(86) PCT No.: PCT/JP02/00897

§ 371 (c)(1),
(2), (4) Date: Aug. 6, 2003

(87) PCT Pub. No.: WO02/063884

PCT Pub. Date: Aug. 15, 2002

(65) Prior Publication Data

US 2004/0076229 A1 Apr. 22, 2004

(30) Foreign Application Priority Data

Feb. 6, 2001 (JP) .............................. 2001-029808

(51) Int. Cl.
*H04N 7/12* (2006.01)
*H04N 11/02* (2006.01)
*H04N 11/04* (2006.01)

(52) U.S. Cl. ................................. 375/240.03

(58) Field of Classification Search ............. 375/240.03
See application file for complete search history.

(56) References Cited

U.S. PATENT DOCUMENTS 5,592,225 A * 1/1997 Kurobe .................. 375/240.03
6,011,590 A * 1/2000 Saukkonen ............ 375/240.05
6,798,838 B1 * 9/2004 Ngo ....................... 375/240.19
6,834,082 B2 * 12/2004 Ejiri et al. .............. 375/240.24

FOREIGN PATENT DOCUMENTS

| EP | 739 138 | 10/1996 |
|---|---|---|
| EP | 782 364 | 7/1997 |
| JP | 11-330984 | 11/1999 |
| WO | WO 00/05898 | 2/2000 |

OTHER PUBLICATIONS

Reibman et al., "Transmission of Multiple Description and Layered Video Over an EGPRS Wireless Network," Proceedings—International Conference on Image Processing, Sep. 10, 2000, vol. 12, pp. 136-139.

* cited by examiner

*Primary Examiner*—David Czekaj
*Assistant Examiner*—Jeremaiah C Huber
(74) *Attorney, Agent, or Firm*—Nixon & Vanderhye, P.C.

(57) ABSTRACT

A wireless image transmission device comprises an encoder 180 which encodes combined image data, and includes quantization means 130 to perform quantization of input data based on a quantization value, and an encoding amount control means to control the encoding amount, comprising: first information portion counting means 100, second information portion counting means 102, first information portion transmission time computation means 105, a second information portion transmission time computation means 110, second information portion transmittable bits computation means 112, untransmitted bits computation means 113, and quantization value computation means 115, so that even when a video bitstream is transmitted using a plurality of modulation methods with different transmission rates, by transmitting in a constant amount of time, bandwidth can be used efficiently.

14 Claims, 14 Drawing Sheets

WIRELESS IMAGE TRANSMISSION DEVICE AND IMAGE TRANSMISSION METHOD

This application is the U.S. national phase of international application PCT/JP02/00897, filed 4 Feb. 2002, which designated the U.S.

TECHNICAL FIELD

The present invention relates to a device for wireless transmission of encoded image data, and in particular to a wireless image transmission device which transmits encoded image data over wireless channels in which modulation methods with different transmission rates can be used with time division, such as OFDM.

BACKGROUND ART

In recent years there has been rapid progress in wireless transmission technology, and in particular there have been dramatic improvements in data transmission speeds.

Until several years ago, the 64 kbps of PHS (Personal Handy-phone System) was the highest transmission rate. At present, the 2.4 GHz band IEEE 802.11b specification enables transmission speeds of up to 11 Mbps. And the 5 GHz band IEEE 802.11a and MMAC (Multimedia Mobile Access Communication System), HiSWANa (High Speed Wireless Access Network Type a), and BRAN (Broadband Radio Access Networks) HiperLAN/2, transmission speeds of 20 to 30 Mbps and above are realized. When transmission speeds reach such levels, wireless realtime transmission of a plurality of video data streams, encoded using MPEG (Moving Picture Expert Group) 1/MPEG2/MPEG4 or other video encoding methods, becomes possible. The above IEEE 802.11a, HiSWANa, and HiperLAN/2 use a modulation method called OFDM (Orthogonal Frequency Division Multiplexing). Keeping with user requests, this modulation method can be time-division multiplexing of channels using modulation methods with high transmission quality but low transmission speed and channels using modulation methods with poor transmission quality but high transmission speed.

The transmission quality is a parameter used to evaluate performance in transmission and reproduction of data; often the BER (bit error rate) or other values are used.

One technique to suppress the reduction of image quality in wireless transmission of images encoded using a video encoding method, of which MPEG1, MPEG2 and MPEG4 are representative, is an "error correction encoding device and decoding device" described in Japanese Patent Laid-open No. 11-330984. In the above publication, when transmitting an encoded image stream over a wireless transmission channel using a modulation method such as OFDM, the stream is divided into important information A and non-important information B. The important information portion is transmitted using modulation method α, with high transmission quality and low transmission speed. The non-important information is transmitted using modulation method β, with low transmission quality but high transmission speed. In this way, a comparatively high image transmission rate can be maintained while preventing large disruptions of image quality.

However, the above-described background art has the following problem. In general, when encoding video data, there are a variable bit rate (VBR), in which the timing of the bit rate (transmission speed) of the output bitstream changes with the content of the video data, and a constant bit rate (CBR), which is controlled such that the bit rate is constant. These are used selectively according to the application. For realtime transmission over networks, CBR, with a constant transmission speed, is suitable.

In a modulation method such as OFDM, in order to perform transmission using two modulation methods with different transmission speeds, even when using a method such as CBR with a constant transmission speed, if the proportion of the number of bits per unit time of the above important information A and non-important information B changes, the transmission speed may change at any time.

FIG. 13A and FIG. 13B are figures showing details of transmission speeds. The total number of bits per unit time for a CBR bitstream is essentially constant even if the proportion of important information A and non-important information B changes, as shown in FIG. 13A. However, this excludes errors occurring in the algorithm for bit rate control. When transmitting this information using a single modulation method, even if the proportion between A and B changes, as in (1) and (2), if a fixed amount of time can be secured, transmission without problems is possible. However, as shown in FIG. 13B, if the bitstream of important information A is modulated using modulation method α and the non-important information B is modulated using modulation method β for transmission over a wireless channel, if the proportion per unit time of the important information A and non-important information B changes as in (1) and (2), because of differences in the amount of transmission per unit time for modulation method α and modulation method β, the transmission time changes. That is, the total number of bits transmitted per unit time (the transmission speed) changes.

If, as explained above, the transmission time changes frequently, the time required for a bitstream increases. Hence it may occur that the increased amount of time cannot be secured, so that delays and losses occur in the bitstream transmission, causing significant degradation of the reproduced video. It may also happen that there is insufficient transmission time for another communication application. It is also possible to respond one-by-one to requests from the video encoding means, so as to dynamically secure transmission time; however, this complicates the system and increases the load on the wireless transmission/reception device.

An object of this invention is to effectively utilize bandwidth through transmission in a fixed amount of time, even when a plurality of modulation methods with different transmission rates are used to transmit a video bitstream.

BRIEF SUMMARY

In one aspect of the technology, an image encoding device is provided which outputs, as an encoded bitstream, combined image information comprising a first information portion, modulated by a first modulation method, and a second information portion, modulated by a second modulation method different from the first modulation method, and which comprises an encoder, which encodes the above combined image data, and which comprises quantification means which performs quantification of input data based on a quantification value, and, encoding amount control means to perform encoding amount control of the encoder, having: first information counting means, which is and which counts the number of bits in the above first information portion; second information counting means, which counts the number of bits of the above second information portion; first information transmission time computation means, which computes the time required for transmission of the above encoded first information portion using the above first modulation method, based on the number of bits in the above first information portion counted by the above first information counting means; second information transmission time computation means, which computes the time which can be used for transmission of the above encoded second information portion, based on the time required for transmission of the above encoded first information portion and the total transmission time, which is the total time which can be used for transmission; means to compute the number of transmittable second information bits, which computes the number of bits of the above second information portion which can be transmitted, based on the time which can be used to transmit the above encoded second information portion and the above second modulation method; means to compute the number of untransmitted bits, which computes the number of untransmitted bits exceeding the above number of transmittable bits of the second information portion, based on the above number of transmittable bits of the second information portion and the above number of bits of the second information portion counted by the second information counting means; and, quantization value computation means, which computes and outputs to the above quantization means a quantization value for use in the next image encoding processing, based on the above number of untransmitted bits.

In another aspect of technology, a wireless image transmission device is provided which has: communication control means, which specifies a first modulation method which is a method of modulation of a first information portion, a second modulation method which is a method of modulation of a second information portion differing from the above first information portion, and total transmission time which is the total time which can be used for transmission; modulation means, which performs modulation of image data based on the above respective modulation methods; wireless transmission/reception means, which outputs signals modulated by the modulation means and receives transmitted wireless signals; demodulation means, which receives signals received by the wireless transmission/reception means, and demodulates the above received signals using modulation methods specified by the above communication control means; and, image encoding means, which encodes input image data and generates a bitstream, and which, based on the above first information portion modulation method, the above second information portion modulation method, and the above total transmission time, specified by the above communication control means, performs encoding amount control upon encoding control during the next total transmission period, based on the number of bits of encoded data which could not be transmitted during the above total transmission time from among the above first information portion data modulated by the above first modulation method and the above second information portion data modulated by the above second modulation method.

In another aspect of the technology, a wireless image transmission system is provided comprising:

a wireless base station, comprising a wireless image transmission device having communication control means which specifies a first modulation method which is a modulation method for a first information portion, a second modulation method which is a modulation method for a second information portion different from the above first information portion, and total transmission time which is the total time which can be used for transmission; modulation means, which modulates image data based on the above modulation method; wireless transmission/reception means, which outputs signals modulated by the modulation means and receives transmitted wireless signals; demodulation means, which receives signals received by the wireless transmission/reception means, and demodulates the above received signals using a modulation method specified by the above communication control means; and, image encoding means, which encodes input image data and generates a bitstream, in which, based on the above first information modulation method, second information modulation method, and total transmission time specified by the above communication control means, performs encoding amount control upon encoding control in the next total transmission period, based on the number of bits of encoded data which could not be transmitted during the above total transmission time among the encoded data of the above first information data resulting from modulation of the above image data by the above first modulation method and the above second information data resulting from modulation by the above second modulation method; and, a plurality of mobile stations, which can decode image data which has been encoded and transmitted over a wireless channel by the above wireless base station.

In still another aspect of this technology, an image encoding method is provided which outputs, as an encoded bitstream, combined image information comprising a first information portion modulated using a first modulation method and a second information portion modulated using a second modulation method different from the above first modulation method, and comprising:

an encoding step in which the above combined image information is encoded, and comprising quantization processing in which input data is quantized based on a quantization value; and, an encoding amount control step, which controls the encoding amount in the encoding step, and having a substep which counts the number of bits of the above first information portion; a first information portion transmission time computation substep, which computes the time required for transmission of the above encoded first information portion using the above first modulation method, based on the number of bits of the above first information portion counted in the above substep to count the first information portion bits; a second information portion transmission time computation substep, which computes the time which can be used for transmission of the above encoded second information portion, based on the time required for transmission of the above encoded first information portion and the total transmission time which is the total time which can be used for transmission; a substep to compute the number of transmittable second information portion bits, which computes the number of bits of the above second information portion which can be transmitted, based on the time which can be used for transmission of the above encoded second information portion and the above second modulation method; a substep for counting the number of bits of the above second information portion; an untransmitted bits computation substep, which computes the number of untransmitted bits exceeding the above number of transmittable bits of the second information portion, based on the above number of transmittable bits of the second information portion and the above number of bits of the second information portion counted by second information portion counting means; and, a quantization value computation substep, which computes and outputs to the above quantization means a quantization value for use in the next image encoding processing, based on the above number of untransmitted bits.

BRIEF DESCRIPTION OF THE DRAWINGS

FIG. 8 is a block diagram showing the configuration of image encoding means of the wireless image transmission device of the first example embodiment;

DETAILED DESCRIPTION

Figure 1:
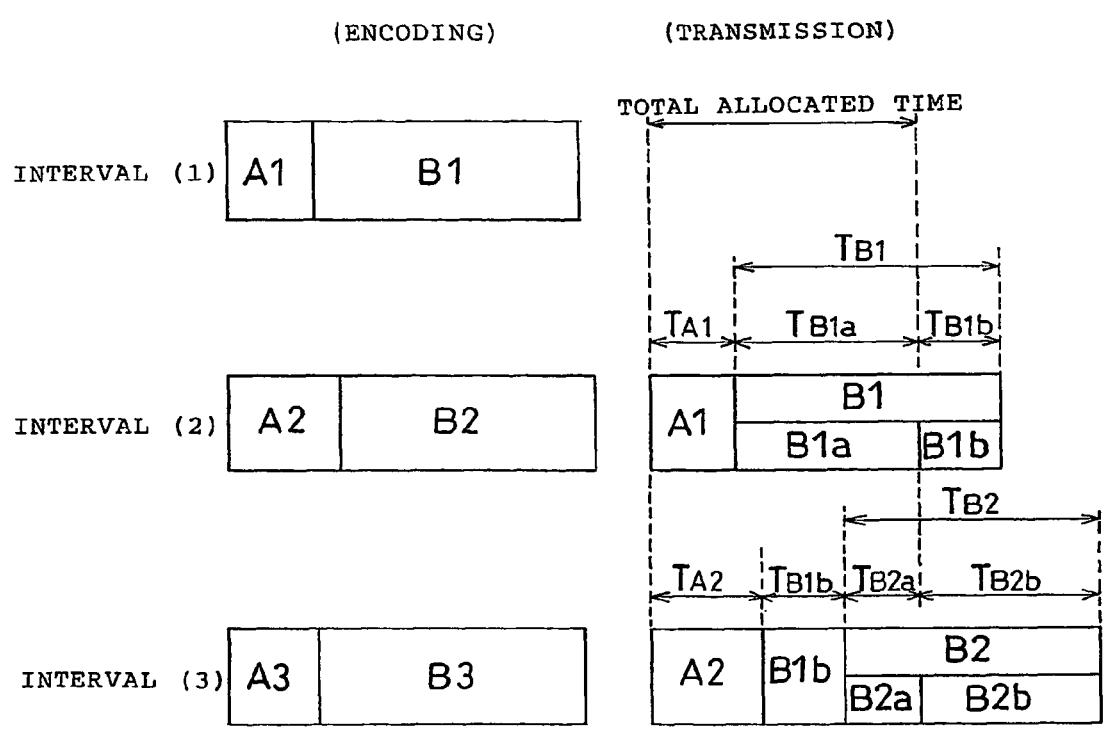
FIG. 1 shows the ratios of the information portion A and information portion B to the total allocated time.

Before explaining aspects of this invention, an inquiry performed by the inventor is first explained, referring to FIG. 1.

In the wireless image transmission device of this technology, image encoding and transmission processing is performed during each time T (the total allocation time). In addition, the encoded image data is divided into an information portion A and information portion B, and transmission is performed using modulation method $\alpha$ for information portion A and modulation method $\beta$ for information portion B.

FIG. 1 shows how encoded data output from image encoding means within a wireless image transmission device is transmitted within an allocated "total allocation time" in each of the intervals (1) to (3), delimited at time T.

In interval (1), encoded data A1 corresponding to the information portion A and encoded data B1 corresponding to the information portion B, generated by the image encoding means, are accumulated temporarily in buffer memory. Of all the encoded data accumulated in buffer memory, the transmission time for encoded data A1 is secured as a time $T_{A1}$ necessary for transmission within the "total allocation time" of interval (2) when using modulation method $\alpha$ for modulation, and all this data is transmitted during interval (2). Encoded data B1 is transmitted in the remaining time $T_{B1a}$ of the "total allocation time"; but when the encoded data B1 is modulated using modulation method $\beta$, and $T_{B1} > T_{B1a}$, the transmission time $T_{B1}$ is larger than the remaining time $T_{B1a}$.

In such cases, the time $T_{B1b}$ ($=T_{B1}-T_{B1a}$) for transmission of the remaining encoded data B1b is secured in interval (3) That is, of the data B1 stored in the buffer in interval (1), the untransmitted portion B1b which could not be transmitted during interval (2) is read and transmitted during interval (3).

On the other hand, in interval (3) the encoded data A2 corresponding to the information portion A and the encoded data B2 corresponding to information portion B generated by the image encoding means during interval (2) are transmitted. Hence when $T_{B1b}+T_{A2}$ (the time required for transmission of data A2)+$T_{B2}$ (the time required for transmission of data B2) exceeds the "total allocation time", the time $T_{B2b}$ of the excess amount must be secured in another interval (4). However, a time $T_{A2}$ necessary for maximum-priority transmission of encoded data A2 is secured in the interval (3). In essence, the above processing is repeated. However, if a state continues in which the amount encoded by the image encoding means exceeds the encoded amount which can be transmitted in the "total allocation time", the buffer memory overflows with encoded data, encoded data is lost, and normal operation becomes impossible.

The inventor thought of a method in which, of the encoded data corresponding to information portion B which is generated by the image encoding means in a given interval, the amount of encoded data which cannot be transmitted during the next interval is counted, and the amount of counted encoded data is added cumulatively. If the cumulatively added value becomes larger than a certain value, in the encoding of the next interval, the amount of encoded data corresponding to the information portion B is reduced. If the cumulatively added value is smaller than a given value, in the encoding of the next interval, the quantization parameter for image encoding is controlled such that the amount of encoded data is increased.

The wireless image transmission device of a first aspect of this technology, based on the above consideration of the inventor, is explained below, referring to the drawings.

In the following explanation of the wireless image transmission device of the first aspect of the technology, it is assumed that encoded image data is divided into an information portion A and an information portion B. When for example using MPEG2 as the encoding method, the following method for classification into an information portion A and information portion B can be used.

Figure 2:
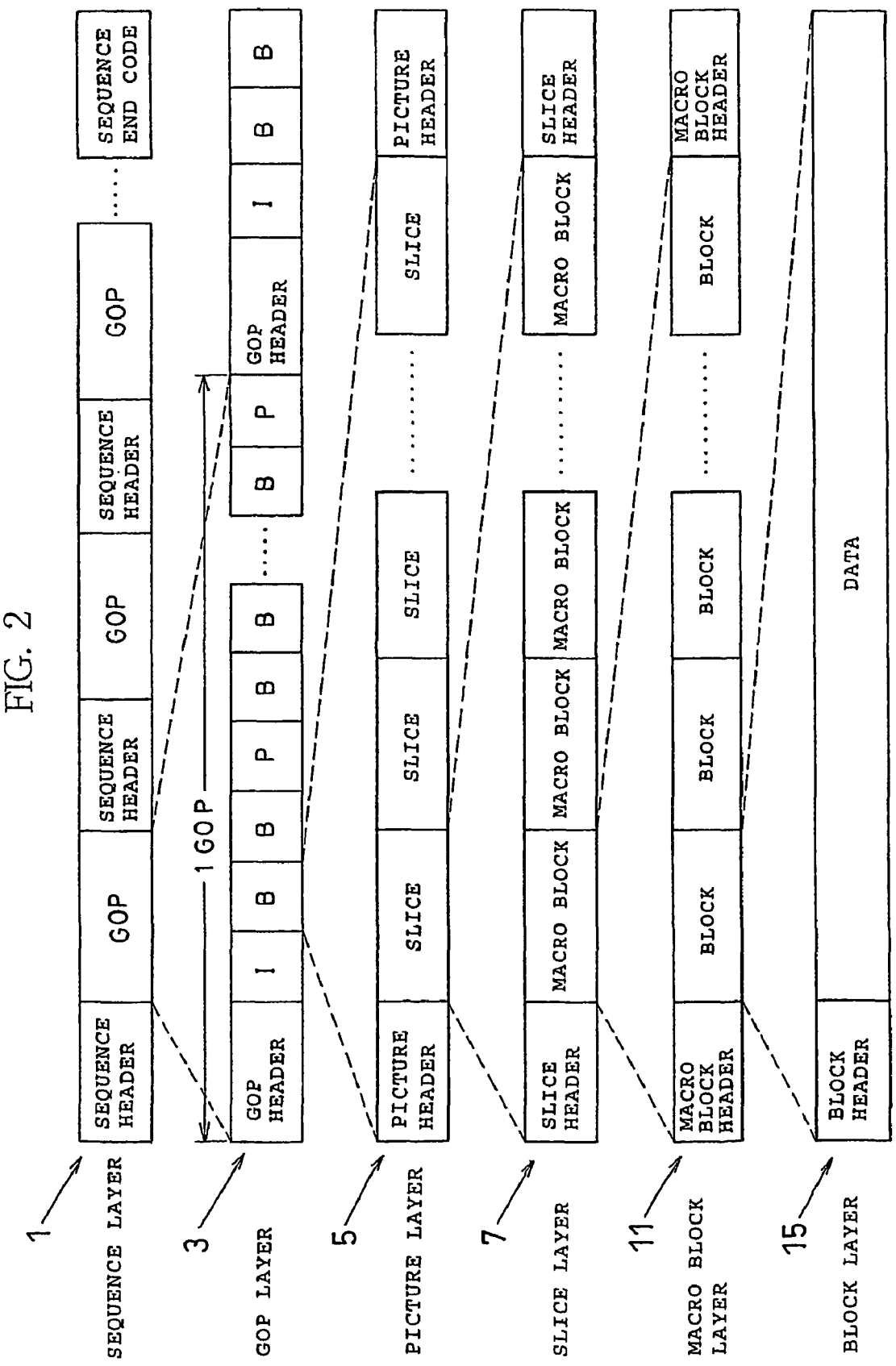
FIG. 2 shows the MPEG2 layer structure and the data configuration in each layer.

FIG. 2 shows the layer structure of an MPEG2 bitstream. The closer a layer is to the top of the figure, the broader the range of original image data which the data of the layer affects. In information portion A, for example, a sequence layer 1, GOP (Group of Picture) layer 3, picture layer 5, and slice layer 7 are allocated. In information portion B, a macro block layer 11 and block layer 15 are allocated.

For the information portion A, a modulation method with low transmission speed but high reliability (good transmission quality) is used. For information portion B, a modulation method with low reliability but with high transmission speed is used. By this means, disturbances in reproduced images can be suppressed while maintaining a comparatively high transmission speed.

Figure 3:
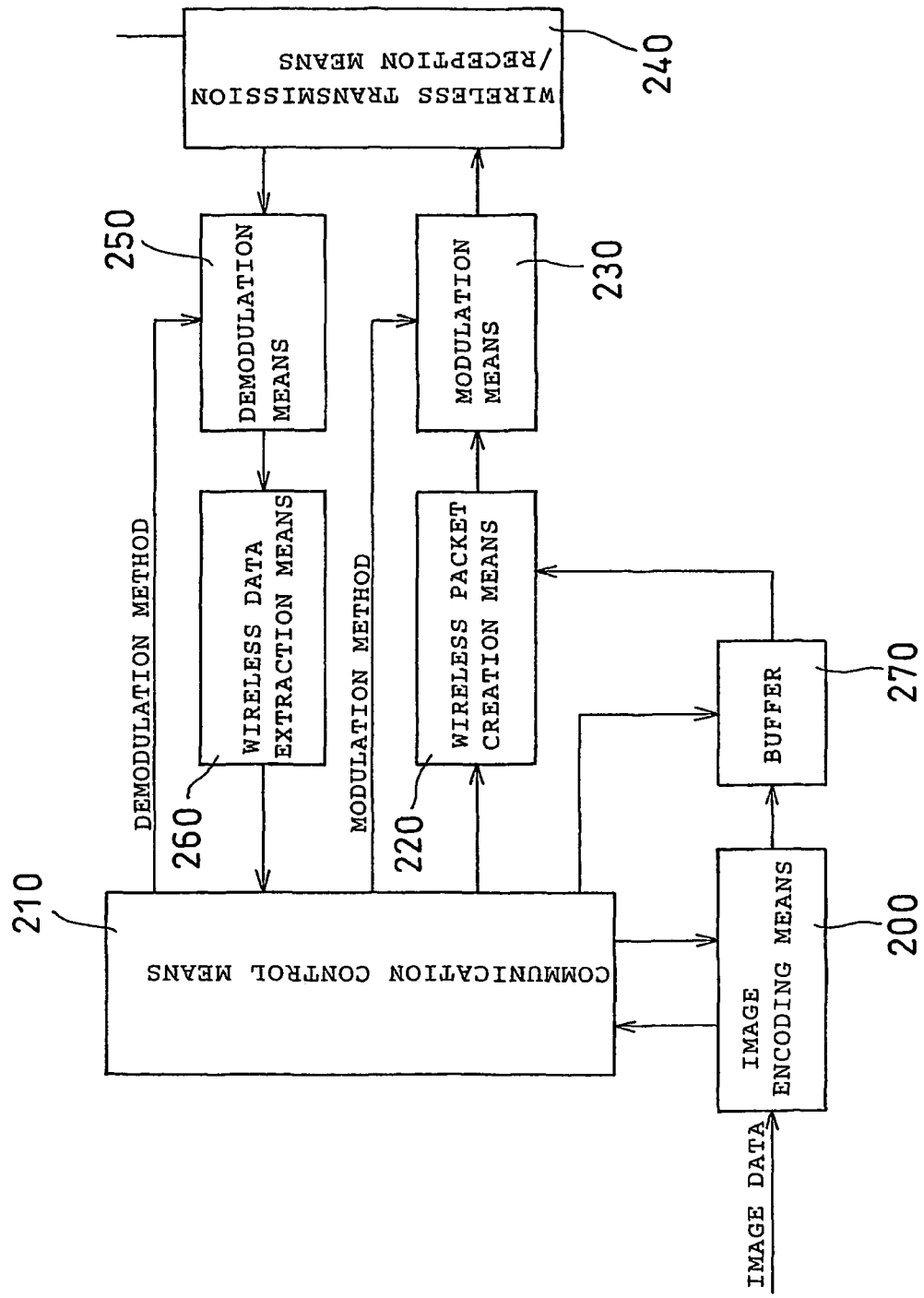
FIG. 3 is a block diagram showing the configuration of the wireless image transmission device in a first example embodiment.

FIG. 3 shows the configuration of an image transmission device of this technology. The image transmission device divides encoded images into an information portion A and an information portion B, and modulates and transmits each using different modulation methods. The image transmission device has image encoding means 200; communication control means 210; wireless packet creation means 220; modulation means 230; and wireless transmission/reception means 240. Furthermore, the image transmission device has demodulation means 250; wireless data extraction means 260; and a buffer 270.

Figure 4:
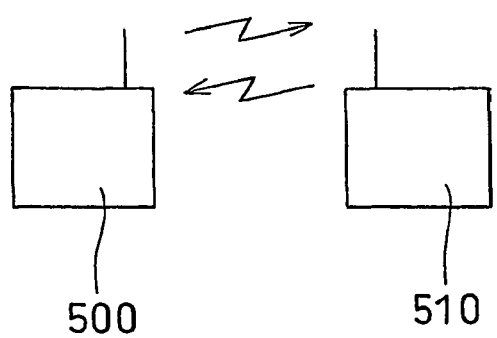
FIG. 4 shows the wireless image transmission device of the first aspect of this invention, and the device on the communication remote side.

The operation of each of the blocks in FIG. 3 is explained below. The communication control means 210 determines the modulation method, demodulation method, allocated band, and similar to be used when the wireless image transmission device 500 of the first aspect of this technology communicates with the communication remoteside device 510 as shown in FIG. 4. Messages are exchanged with the communication remote-side device 510 according to a wireless protocol (IEEE 802.11a, MMAC HiSWANa, BRAN HiperLAN/2, or similar). At this time, the image transmission device 500 holds the modulation methods, demodulation methods and allocated band by means of the communication control means 210, until they are changed. Messages and similar which depend on the wireless protocol are created and output by this communication control means 210. The communication control means 210 inputs and decodes the above messages.

Parameters for image transmission which are determined before the communication control means 210 performs image transmission by means of the above message exchange include, for example, the information portion A modulation method, information portion B modulation method, and total allocated time. The encoded image data for transmission is divided into information portion A and information portion B. Here the modulation method used to transmit information portion A is called the "information portion A modulation method", and the modulation method used to transmit information portion B is called the "information portion B modulation method".

Figure 5:
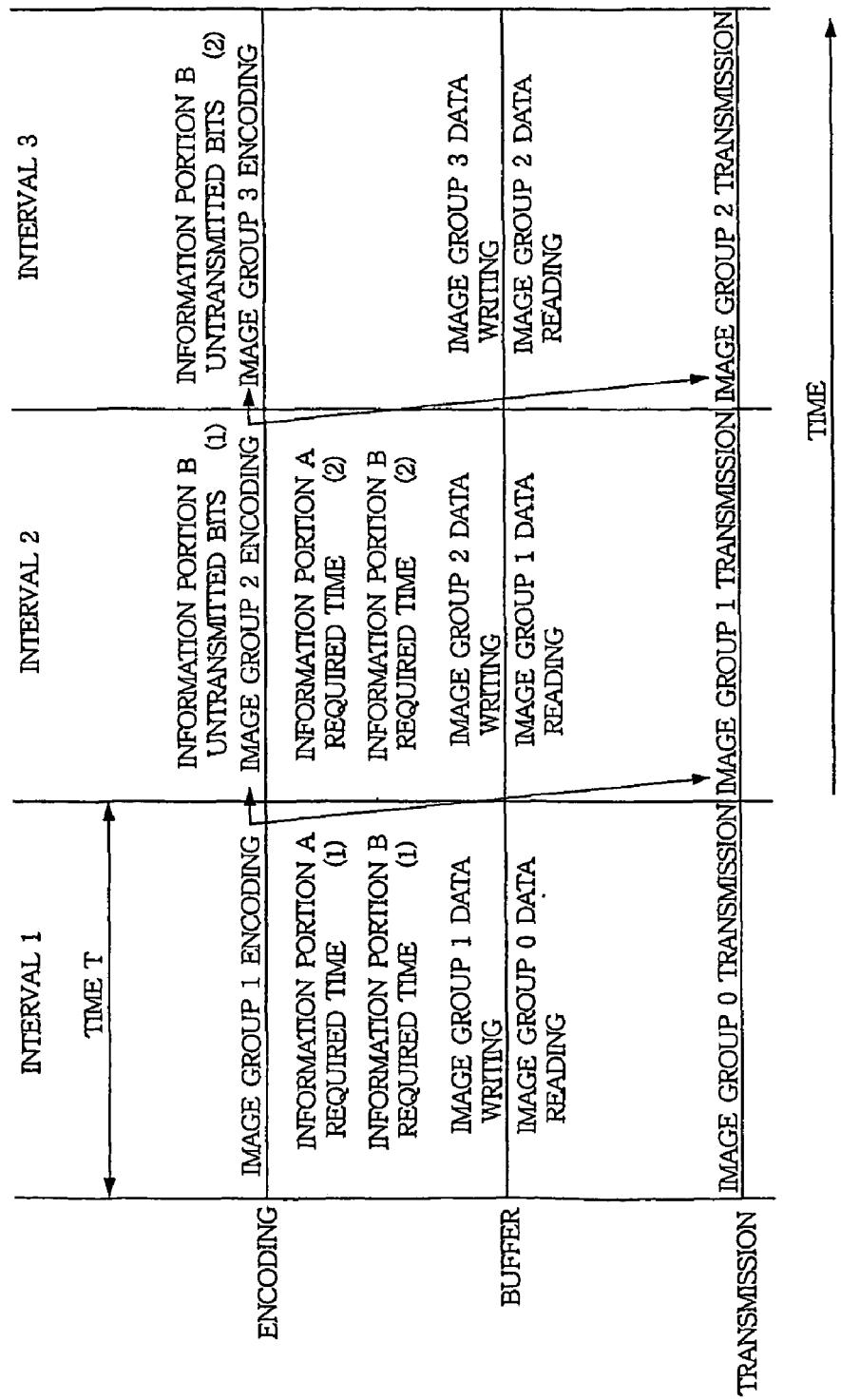
FIG. 5 shows the processing procedure of the wireless image transmission device of the first example embodiment.

The "total allocation time" is the total amount of time that can be used for transmission of information portion A and information portion B within an interval delimited at time T as shown in FIG. 5. The above three types of parameters are supplied to the image encoding means 200.

The communication control means 210 controls the timing of transmission of the bitstream of encoded image data over the wireless channel. Based on an "information portion A required time" and "information portion B required time" (explained in detail below) provided by the image encoding means 200, negotiation with the communication remote device 510 is performed, the transmission times for information portion A and information portion B are determined, and instructions are issued to read the transmission bitstream from the buffer 270 according to the above transmission start times.

Figure 7:
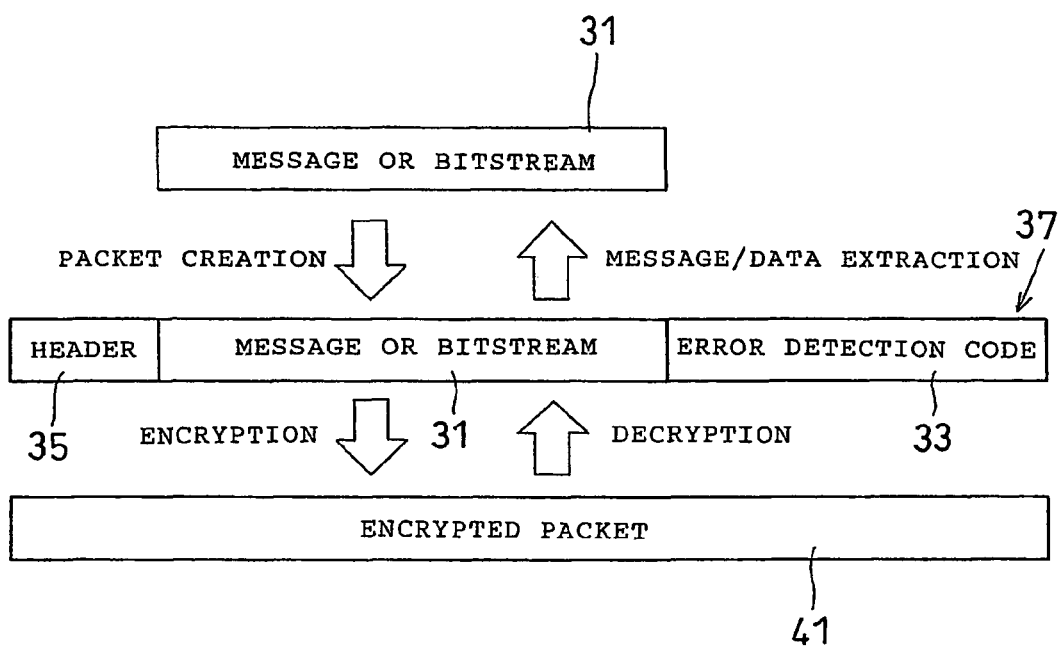
FIG. 7 explains the procedure for packet creation of messages and data for wireless transmission using the wireless image transmission device of the first example embodiment.

As shown in FIG. 3, the wireless packet creation means 220 converts a message created by the communication control means 210 or bitstream 31 (FIG. 7) created by the image encoding means 200 into the form of a packet 37 (FIG. 7) for transmission over the wireless channel. This mainly involves appending of error detection codes 33 (FIG. 7) and appending of a header 35 (FIG. 7).

The modulation means 230 is a block capable of switching with time division between modulation methods such as BPSK (binary phase shift keying), QPSK (quadrature phase shift keying), and 16QAM (quadrature amplitude modulation) for the input data. Except in cases when the modulation method is determined in advance by provisions of the wireless protocol, modulation is performed using the modulation method specified by the communication control means 210. When the modulation method is determined by the provisions of the wireless protocol, that modulation method is used.

The wireless transmission/reception means 240 outputs to the wireless channel the signals modulated by the modulation means 230, and receives wireless signals sent from the communication remote device 510 (FIG. 4), passing them to the demodulation means 250.

The demodulation means 250 is a block which demodulates signals received from the wireless transmission/reception means 240 using the demodulation method specified by the communication control means 210. Similarly to the modulation means 230, the demodulation method can be switched with time division. When the demodulation method is specified by the wireless protocol, demodulation is performed using the demodulation method specified by the protocol.

The wireless data extraction means 260 is a block which extracts a message or similar from a demodulated wireless packet, as shown in FIG. 7. This mainly involves decoding, error detection, and header deletion. The extracted data is sent to the communication control means 210.

The image encoding means 200 encodes the input image data and generates a bitstream. Based on the "total allocation time", "information portion A modulation method", and "information portion B modulation method" provided by the communication control means 210, the input image is encoded so as to become an encoded data amount which can be transmitted within the "total allocation time" currently secured, and the "information portion A required time" and "information portion B required time" parameters are passed to the communication control means 210. The encoded bitstream is written to the buffer 270. The buffer 270 stores the bitstream 31, and outputs the bit stream when so instructed by the communication control means 210.

Figure 8A:
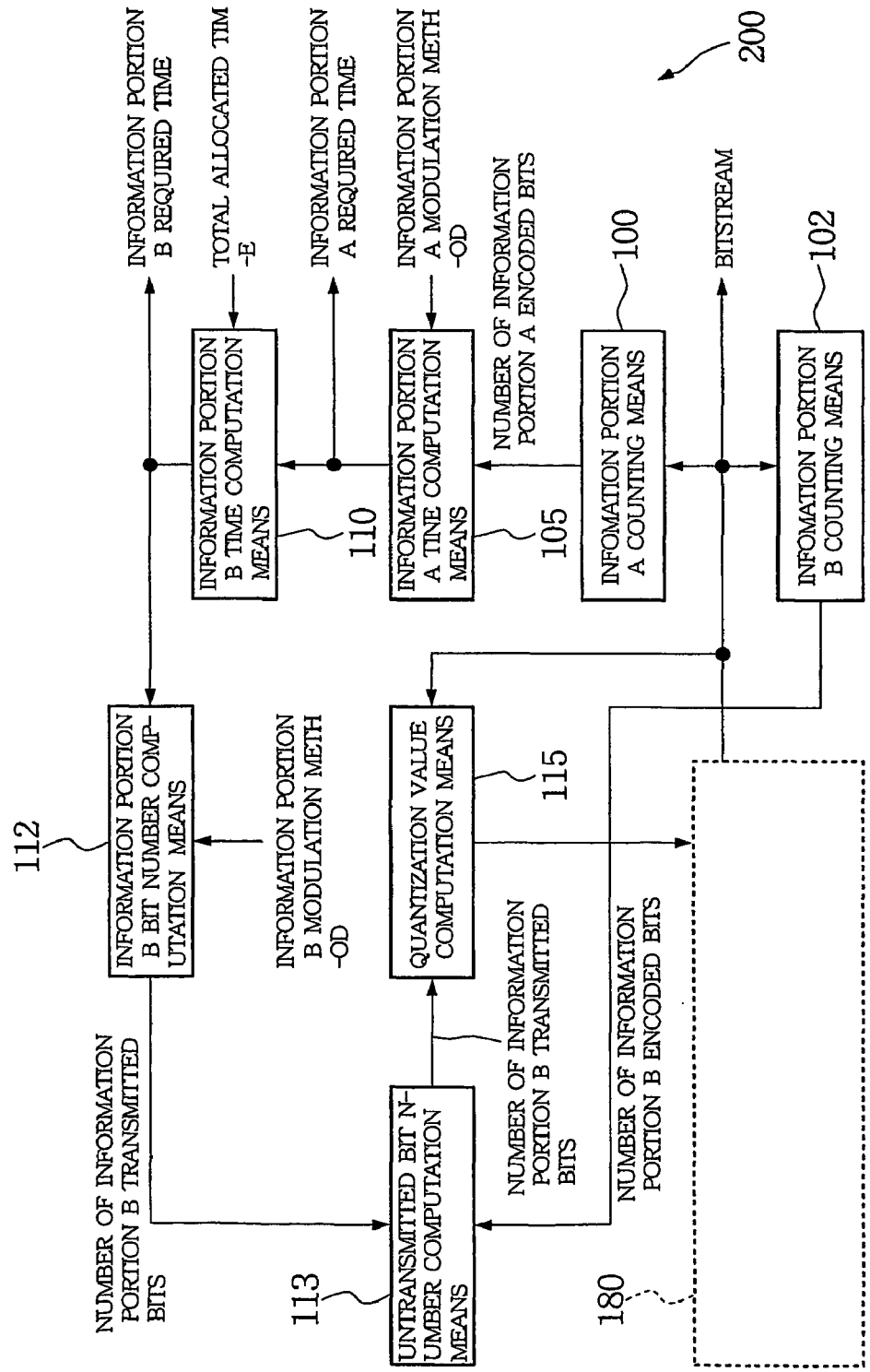
FIG. 8A shows the overall configuration of the image encoding means.

Here the image encoding means 200 is explained in further detail. As shown in FIG. 8A, which illustrates in detail the image encoding means 200 of FIG. 3, the image encoding means 200 has information portion A counting means 100; information portion B counting means 102; information portion A time computation means 105; information portion B time computation means 110; information portion B bit number computation means 112; untransmitted bit number computation means 113; and quantization value computation means 115. In addition, the image encoding means 200 has an encoder 180.

Figure 8B:
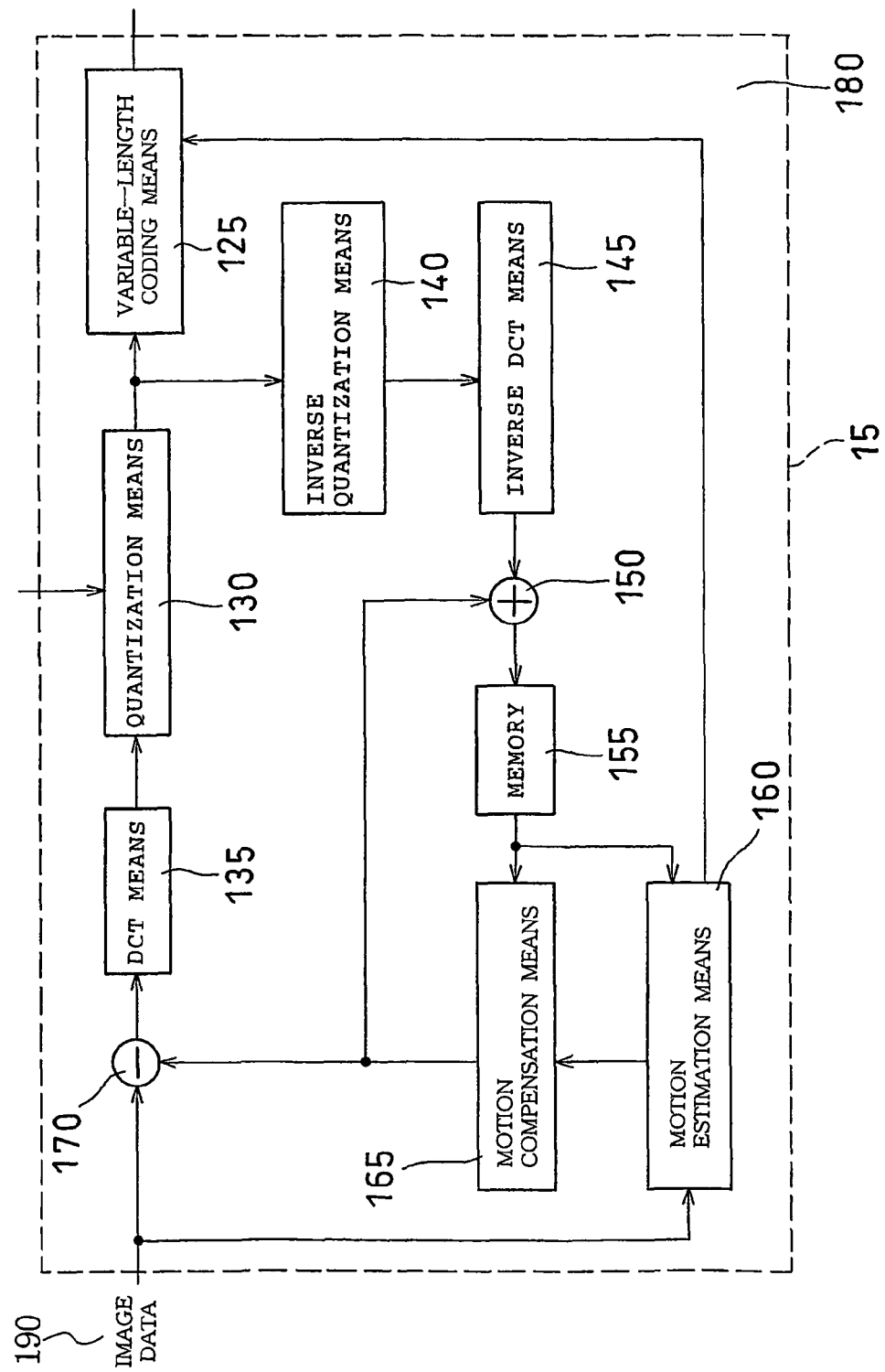
FIG. 8B shows the portion of the image encoding means which is configured similarly to an ordinary encoder.

As shown in FIG. 8B, the encoder 180 has a variable-length coding means 125; quantization means 130; DCT means 135; inverse quantization means 140; inverse DCT means 145; adder 150; memory 155; motion estimation means 160; motion compensation means 165; and subtractor 170. This construction is equivalent to the configuration of an ordinary video encoder (MPEG1/2/4 or similar); details are described in, for example, *Saishin MPEG Kyoukasho*, edited by Hiroshi Fujiwara.

Figure 9:
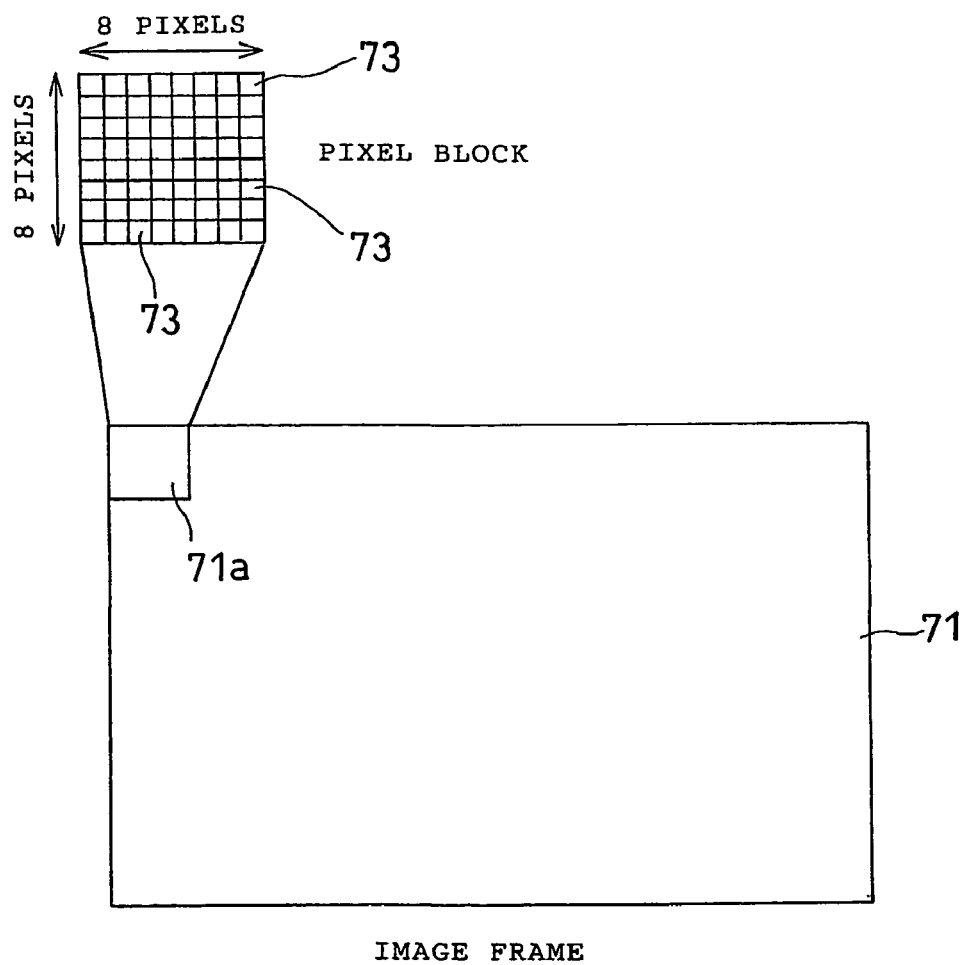
FIG. 9 shows the configuration of an image block.

Below, the details of operation of the image encoding means 200 shown in FIG. 8A are explained. The image encoding means 200 explained here is assumed to perform processing mainly in each image block. The image block 71*a* is, as shown in FIG. 9, one unit within the image frame 71, comprising an 8×8 arrangement of pixels 73.

As shown in FIG. 8B, the image data 190 is input to the subtractor 170 and to the motion estimation means 160. In the subtractor 170, the output value of the motion compensation means 165 is subtracted from the image data. However, if motion compensation is not performed (in the case of intrablocks), "0" is used in place of the output value of the motion compensation means 165, and the output of the subtractor 170 is the input image data itself. An intra-block is an image block which performs encoding in the data of the same image frame only, without using inter-frame prediction.

The output of the subtractor 170 is input to the DCT means 135, and a DCT (discrete cosine transform) operation is performed, The output is sent to the quantization means 130.

In the quantization means 130, quantization of the input data is performed, based on the quantization value computed by the quantization value computation means 115. The quantization value is at first set to some initial value. Subsequently, the value is modified during each cycle (for example, on each image frame). In video encoding methods such as MPEG in which the configuration is similar to that of an encoder 180, adjustment of the amount of encoded data generated is mainly performed by this quantization means 130. The quantized data and quantization value are sent to the variable-length coding means 125 and inverse quantization means 140.

The inverse quantization means 140 performs inverse quantization by multiplying quantized data by a quantization value. Image data is provided in a finite number of bits (for example, eight bits), so that, so long as the quantization value is not 1, the quantized data is different in value from the value before quantization. Quantized data is sent to the inverse DCT means 145. The inverse DCT means 145 performs an inverse DCT operation on the inverse-quantized data.

After inverse DCT processing, data is sent to the adder 150. If the input data has been subjected to subtraction of the output value of the motion compensation means 165 by the subtractor 170 (non-intra-block), the adder 150 adds the output value of the motion compensation means 165, creates data corresponding to the input image data (with values differing by the difference resulting from quantization and inverse quantization processing), and writes this to the memory 155. Data corresponding to an intra-block has been subtracted by the subtractor 170, and so "0" is added. At this time, the output of the adder 150 is the inverse DCT value itself.

Figure 10A:
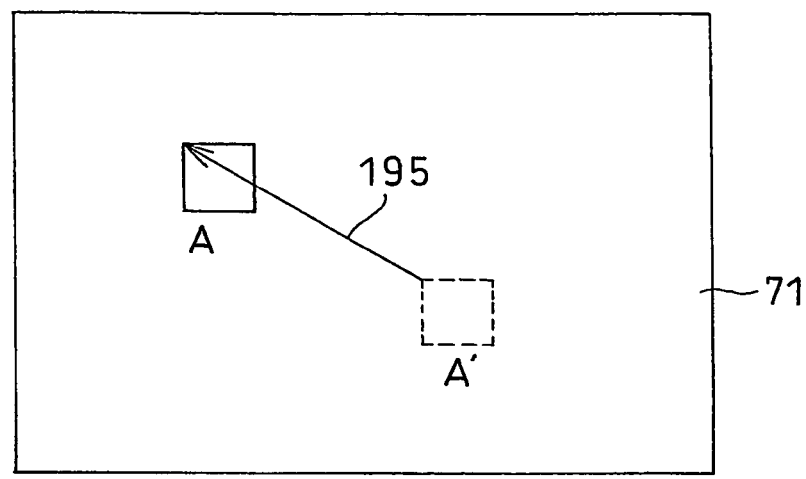
FIG. 10A and FIG. 10B explain the movement vector in image encoding.
Figure 10B:
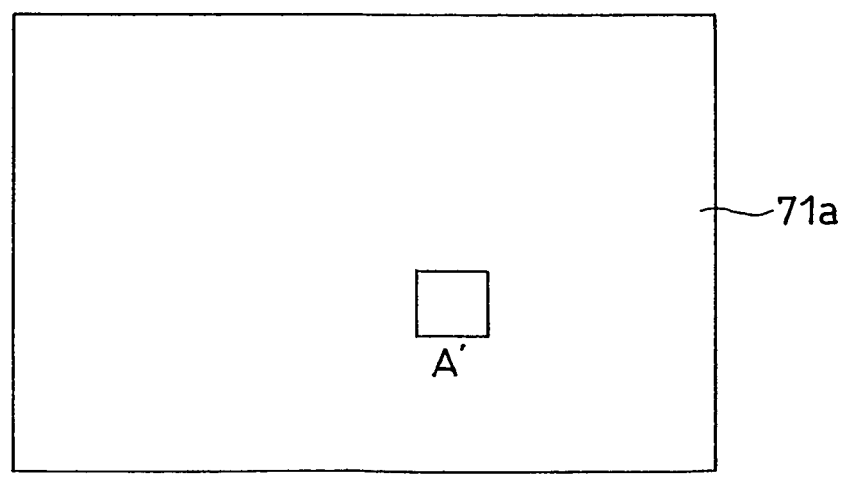

The procedure for calculation of the motion vector 195 is explained, referring to FIG. 10A and FIG. 10B. Data created as described above is written to the memory 155 as the reference image frame data shown in FIG. 10B, and is referenced in motion estimation processing by the motion estimation means 160 and in motion compensation processing by the motion compensation means 165.

The motion estimation means 160 searches for an image block A' approximating the image block A to be processed (FIG. 10A) from among the reference image data (FIG. 10B stored in memory 155, and based on the relative positions of A and A', computes the motion vector 195. The motion vector 195 thus obtained is sent to the motion compensation means 165 and used in motion compensation processing, and is also sent to the variable-length coding means 125 for encoding.

The motion compensation means 165 reads image data from memory according to the motion vector 195 supplied by the motion estimation means 160, and sends it to the subtractor 170.

The variable-length coding means 125 subjects the quantized data received from the quantization means 130 and the motion vector 195 received from the motion estimation means 160 to variable-length encoding, and generates and outputs a bitstream.

The above is a brief explanation of the operation of the encoder 180; however, the encoder configuration is not limited to this.

Figure 6:
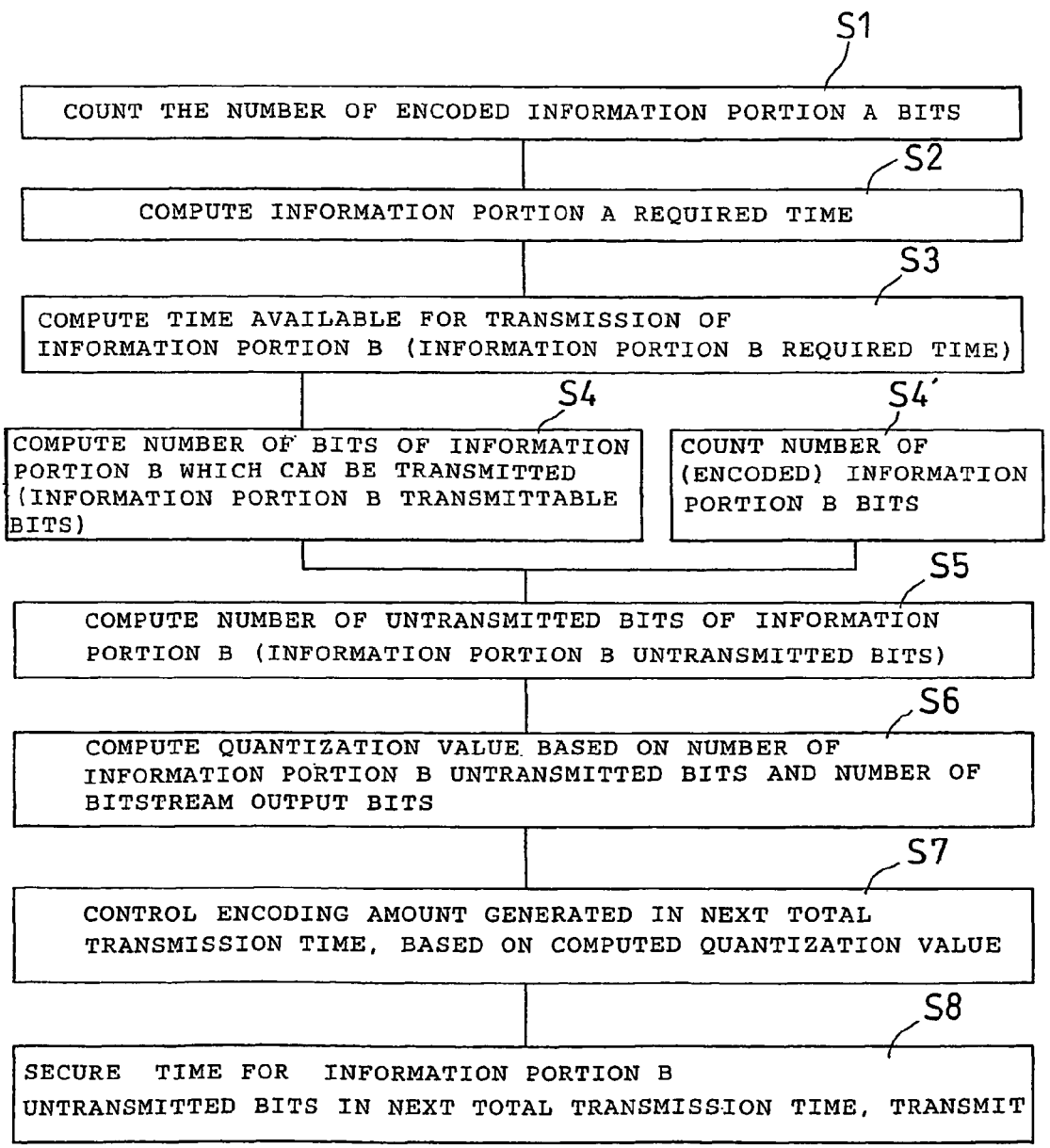
FIG. 6 is a flowchart showing the procedure for allocation of information transmission time using the wireless image transmission device of the first example embodiment.

In the image encoding means 200 in FIG. 8A and FIG. 8B, the information portion A counting means 100, information portion B counting means 102, information portion A time computation means 105, information portion B bit number computation means 112, untransmitted bit number computation means 113, and quantization value computation means 115 control the encoding amount of the encoder 180. The flow of encoding amount control is explained below, referring to FIG. 6.

In step S1, the information portion A counting means 100 counts the number of bits in the information portion A portion of the bitstream output from the variable-length coding means 125. This counting is performed at each interval delimited by a certain time, as shown in FIG. 5. The counting means is reset at the end of each interval, and counting begins anew. The number of bits counted at the end of an interval (the number of encoded information portion A bits) is supplied to the information portion A time computation means 105.

In step S2, at the end of an interval delimited at time T, the information portion A time computation means 105 computes the "information portion A required time", or time required for transmission of information portion A, from the "number of information portion A encoded bits" obtained from the information portion A counting means 100 and the "information portion A modulation method" supplied by the communication control means 210, and sends the result to the information portion B time computation means 110 and the communication control means 210 (FIG. 3).

Figure 11:
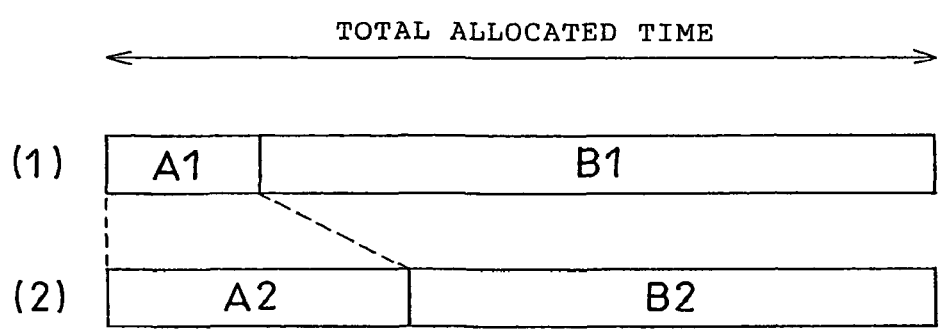
FIG. 11 shows the ratios of the information portion A and information portion B to the total allocated time using the wireless image transmission device of the first example embodiment.

In step S3, at the end of the above interval delimited at time T, the information portion B time computation means 110 computes the "information portion B required time" by subtracting the "information portion A required time" provided by the information portion A time computation means 105 from the "total allocation time" (total transmission time) provided by the communication control means 210. The "information portion B required time" thus computed is provided to the information portion B bit number computation means 112 and the communication control means 210. For example, if the "information portion A required time" is A1 as shown in FIG. 11, the "information portion B required time" is B1. On the other hand, if the "information portion A required time" is A2, then the "information portion B required time" is B2. Even if the ratio of A1 to B1 is different from the ratio of A2 to B2, the sum of the "information portion A required time" and the "information portion B required time" is always essentially constant.

In step S4, at the end of the above interval delimited at time T, the information portion B bit number computation means 112 computes the number of bits of information portion B which can be transmitted during the above interval delimited at time T (number of information portion B transmission bits) from the "information portion B required time" provided by the information portion B time computation means 110 and from the "information portion B modulation method" provided by the communication control means 210, and supplies the result to the untransmitted bit number computation means 113.

In step S4', the information portion B counting means 102 counts the number of bits in the information portion B portion of the bitstream output by the variable-length coding means 125. This counting is, as in the case of the information portion A counting means 100, performed in each interval delimited at time T, as shown in FIG. 5, the counting means is reset at the end of each interval, and counting begins anew. The number of bits counted at the end of the above interval (the number of information portion B encoded bits) is supplied to the untransmitted bit number computation means 113.

In step S5, at the end of the above interval delimited at time T, the untransmitted bit number computation means 113 subtracts the "number of information portion B transmitted bits" computed in step S4 and provided by the information portion B bit number computation means 112 from the "number of information portion B encoded bits" computed in step S4' and provided by the information portion B counting means 102. While encoding continuous image data, this value is added cumulatively. The cumulative addition result (number of information portion B untransmitted bits) is determined and is sent to the quantization value computation means 115. The cumulative addition value does not take on negative values.

In step S6, the quantization value computation means 115 monitors the "number of information portion B untransmitted bits" and the number of bitstream bits output from the variable-length coding means 125, computes the quantization value to be used in encoding performed in the next total transmission interval such that the amount of the encoded bitstream is appropriate for the transmission, and provides the result to the quantization means 130.

In step S7, the amount of encoded data generated is controlled, based on the computed quantization value. For example, if the "number of information portion B untransmitted bits" is larger than a certain standard value, the quantization value is increased, and the amount of encoded data generated is reduced. If the "number of information portion B untransmitted bits" is smaller than a standard value, the quantization value is decreased, and the amount of encoded data is increased. In step S8, the information portion B untransmitted bits are transmitted within the next total allocation time (total transmission time). In encoding during the next total allocation time (total transmission time), a newly determined quantization value is used.

Here, the manner of increase or decrease of the "number of information portion B untransmitted bits" with increases or decreases in the number of bits in the generated bitstream may be measured, and the result used as an algorithm for control of the amount of encoded data generated.

Below, operation of the overall image transmission device of the first aspect of this invention is explained, referring to FIG. 5.

The image transmission device performs processing on the basis of the time T, which is the total allocation time (total transmission time). Image data for encoding and transmission is divided into a group 1 (for example, 1 GOP is 1 group; see FIG. 2), and the image data of this group is processed at each time T. First, in interval 1 the image group 1 is encoded by the image encoding means 200. At the end of interval 1, an information portion A required time (1) and information portion B required time (1) for the image group 1 are obtained. Hence based on the information portion A required time (1) and information portion B required time (1), the transmission time for transmission of the image group 1 in the interval 2 is determined, and this time is secured. Securing of this transmission time is performed by the communication control means 210. At the end of interval 1, the number of information portion B untransmitted bits (1) is also obtained, and quantization value computed by this is used to control the amount of encoded data for information portion B of the image group 2.

The encoded data of image group 1 is written temporarily to the buffer in interval 1, and on entering interval 2 or after is read and transmitted. The communication control means 210 specifies the timing for reading data in the buffer memory.

By repeating the above processing in each time T, the image data is encoded and transmitted.

In the above configuration example, transmission is performed in the next interval after encoding; if the buffer capacity is sufficient to enable storage of data for time equal to 2T or greater, however, transmission may be performed several intervals after encoding.

Figure 12:
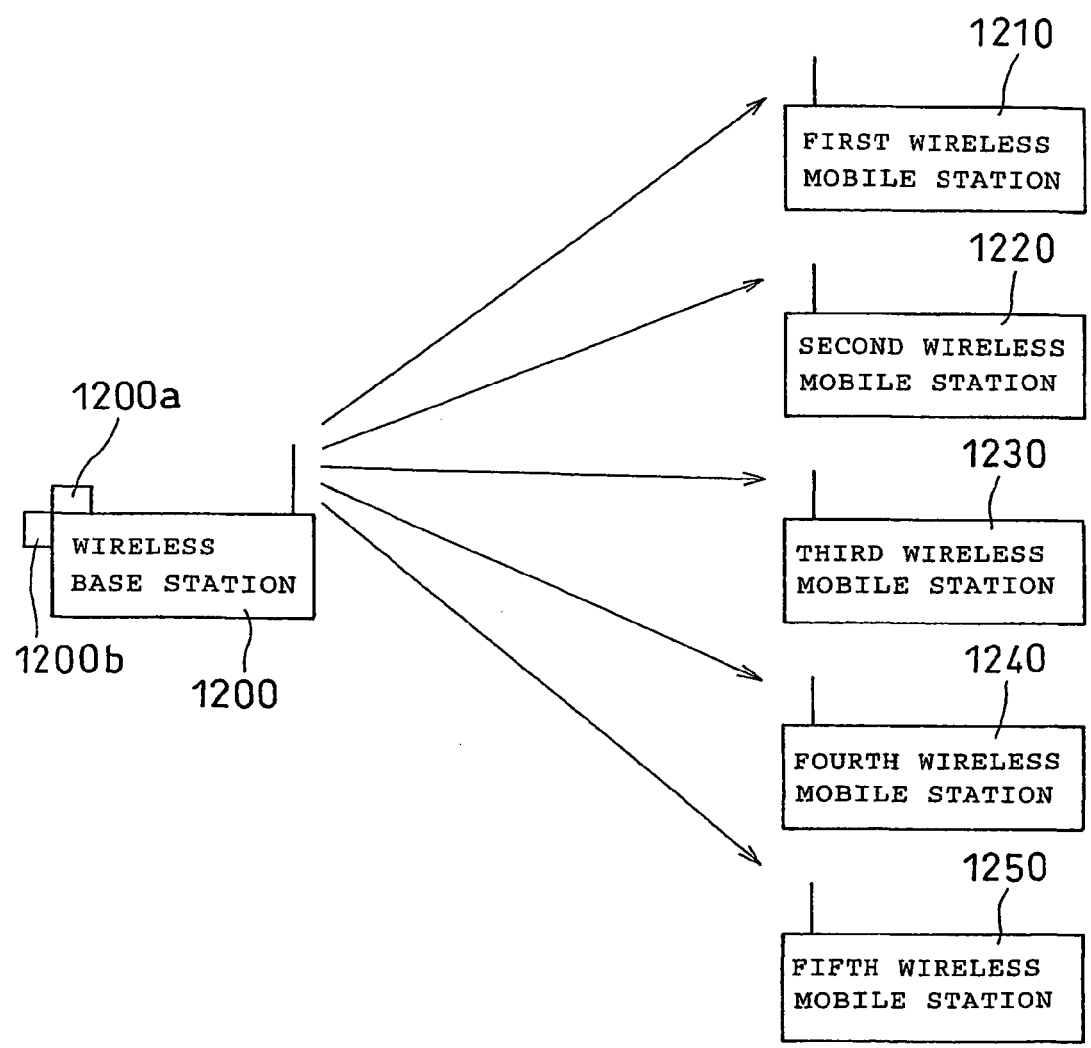
FIG. 12 is a diagram of the configuration of a system of a second embodiment of this invention, which uses the wireless image transmission device described in the first embodiment.
Figure 13A:
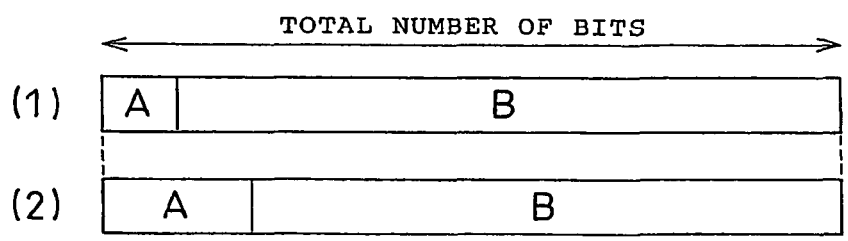
FIG. 13A shows the configuration of a CBR bitstream.
Figure 13B:
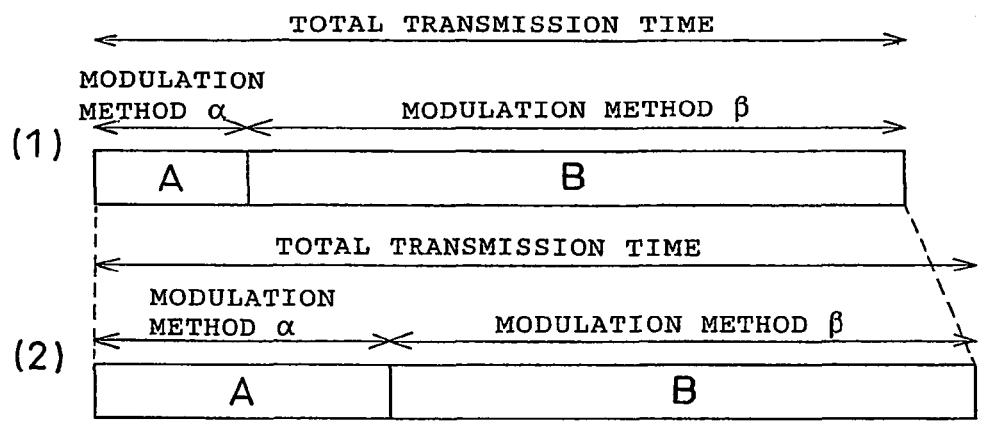
FIG. 13B shows the transmission time for a case in which a stream is transmitted using two types of modulation method.

Next, the wireless system of a second embodiment of this invention is explained, referring to FIG. 12.

The wireless system of this second aspect of the invention is configured using the wireless image transmission device of the first aspect of the invention.

In FIG. 12, the symbol 1200 is a wireless base station, comprising the wireless image transmission device of the first aspect (hereafter simply "wireless image transmission device"), a storage device 12a to store images, or a wire/wireless TV tuner 1200b.

The symbols 1210 to 1250 in FIG. 12 are first through fifth wireless mobile stations, which have functions to demodulate image data sent by a wireless image transmission device (divided into information portions A and B, each modulated using different modulation methods), restoring the original image data.

The operation of such a wireless system is here explained. The base station 1200 uses the wireless image transmission device to encode and transmit images stored by the storage device 1200a or similar, or images received by the TV tuner 1200b or similar. As explained in the first aspect, by using the above wireless image transmission device, the transmission time can be held fixed.

If for example the transmission time is set to 0.2 seconds, five separate images can be transmitted in realtime to the five wireless mobile stations 1210 to 1250.

That is, a wireless system can be realized enabling the viewing of different movies and TV broadcasts by the first through fifth wireless mobile stations 1210 to 1250.

In the prior art, the time required for transmission of individual images fluctuates, so that the number of images which can be transmitted simultaneously is small. For example, even if the average transmission time is the same 0.2 seconds as in the above, if in the case of the greatest amount of time required 0.3 seconds must be spent to transmit image data, transmission must be performed assuming 0.3 seconds will be required.

In this case, when data for four or more images are transmitted simultaneously, if the plurality of images in transmission simultaneously reach a peak transmission time, significant deterioration occurs in a portion or in all of the images being transmitted. Hence only three images can be transmitted simultaneously. When such time allocation is performed, moreover, the efficiency of use of the transmission time declines.

If the wireless system shown in FIG. 12 is used, even when image transmission coexists with other types of data communication, declines in data communication speeds arising from sudden increases in image transmission volume can be prevented.

INDUSTRIAL APPLICABILITY

As described above, when a wireless transmission device of this invention is used, even if a plurality of modulation methods with different transmission rates are used to transmit a video bitstream, transmission can be performed in a fixed amount of time, and effective bandwidth use is possible. It is also possible to realize QoS (Quality of Service).

The invention claimed is:

1. An image encoding device, which outputs as an encoded bitstream combined image information, including a first information portion modulated by a first modulation method and a second information portion modulated by a second modulation method different from said first modulation method with different transmission rates that can be used with time division, said first and second modulation method being used to transmit serially, and wherein said first information portion and said second information portion is divided from an image data, comprising an encoder, which encodes said combined image data, and comprises quantization means which performs quantization of input data based on a quantization value; and, encoding amount control means, which controls the amount of encoding of the encoder, having:

first information counting means, which counts the number of bits of said first information portion;

second information counting means, which counts the number of bits of said second information portion;

first information portion transmission time computation means, which computes the time required for transmission of said encoded first information portion using said first modulation method, based on the number of bits of said first information portion counted by said first information portion counting means;

second information portion transmission time computation means, which computes the time available for transmission of said encoded second information portion, based on the time required for transmission of said first encoded information portion and the total transmission time, which is the total time available for transmission;

second information portion transmittable bits computation means, which computes the number of bits of said second information portion which can be transmitted, based on the time available for transmission of said encoded second information portion and said second modulation means;

untransmitted bits computation means, which computes the number of untransmitted bits exceeding the number of transmittable bits of said second information portion, based on the number of transmittable bits of said second information portion and the number of bits of said second information portion counted by said second information portion counting means; and, quantization value computation means, which computes and outputs to said quantization means a quantization value for said second information portion for use in the next image encoding consisting of said number of untransmitted bits of said second information portion, keeping the sum of the time required for transmission of the first information portion and the time required for transmission of the second information portion essentially constant over more than one transmission interval based on said number of untransmitted bits; and wherein a ratio of an amount of information in the first information portion to an amount of in formation in the second information portion changes from a first transmission interval to a second transmission interval.

2. The image encoding device according to claim 1, wherein either the transmission quality, or the transmission speed, or both, are different for said first modulation method and for said second modulation method.

3. A wireless image transmission device, having:

communication control means, which specifies a first modulation method as a modulation method for a first information portion, a second modulation method as a modulation method for a second information portion differing from said first information portion with different transmission rates that can be used with time division, said first and second modulation method being used to transmit serially, said first information portion and said second information portion being divided from an image data, and a total transmission time which is the total time available for transmission;

modulation means, which modulates image data based on the respective said modulation methods;

wireless transmission/reception means, which outputs signals modulated by the modulation means, and receives transmitted wireless signals;

demodulation means, which receives signals received by the wireless transmission/reception means, and demodulates said received signals by a modulation method specified by said communication control means;

image encoding means, which is an image encoding means to encode input image data and generate a bitstream, in which, based on said first information portion modulation method, said second information portion modulation method, and said total transmission time specified by said communication control means, the amount of encoding is controlled during encoding control in the next total transmission interval as the sum of the time required for transmission of the first information portion and the time required for transmission of the second information portion is essentially constant over more than one interval, based on the number of bits of the encoded data that cannot be transmitted in said total transmission time, among the encoded data of said first information portion data modulated by said first modulation method and said second information portion data modulated by said second modulation method, and wherein a ratio of an amount of information in the first information portion to an amount of information in the second information portion changes from a first transmission interval to a second transmission interval.

4. The wireless image transmission device according to claim 3, wherein said image encoding means has an encoder which encodes said combined image data, and includes quantization means to perform quantization of input data based on a quantization value, and encoding amount control means which controls the amount of encoding of the encoder; and comprising:

first information portion counting means, which counts the number of bits of said first information portion;

second information portion counting means, which counts the number of bits of said second information portion;

first information portion transmission time computation means, which, based on the number of bits of said first information portion counted by said first information portion counting means, computes the time required to transmit said encoded first information portion using said first modulation method;

second information portion transmission time computation means, which, based on the time required for transmission of said encoded first information portion and the total transmission time allocated for transmission, computes the time available for transmission of said encoded second information portion;

second information portion transmittable bits computation means, which, based on the time available for transmission of said encoded second information portion and said second modulation method, computes the number of bits of said second information portion which can be transmitted;

untransmitted bits computation means, which, based on the number of transmittable bits of said second information portion and the number of bits of said second information portion counted by the second information portion counting means, computes the number of untransmitted bits exceeding the number of transmittable bits of said second information portion; and, quantization value computation means, which, based on said number of untransmitted bits, computes and outputs to said quantization means a quantization value for said second information portion to be used in the next image encoding consisting of said number of untransmitted bits of said second information portion, keeping that the sum of the time requirement for transmission of the first information portion and the time required for transmission of the second information portion required time is essentially constant.

5. The wireless image transmission device according to claim 3, wherein said communication control means allocates bandwidth necessary for transmission of said first information portion and said second information portion to said total transmission time, based on the transmission channel protocol, the time required for transmission of said first information portion, and the time required for transmission of said second information portion.

6. The wireless image transmission device according to claim 3, wherein either the transmission quality, or the transmission speed, or both, of said first modulation method and said second modulation method differ.

7. The wireless image transmission device according to claim 3, having a buffer memory to store a bitstream which encodes said first information portion and said second information portion.

8. The wireless image transmission device according to claim 7, wherein said communication control means also manages transmission timing of said bitstream, and indicates to said buffer memory the timing for output of the stored bitstream.

9. A wireless image transmission system, comprising a plurality of mobile stations capable of decoding image data encoded and transmitted over a wireless channel by a wireless base station, and said wireless base station, having:
  communication control means, which specifies a first modulation method which is the modulation method for a first information portion, a second modulation method which is the modulation method for a second information portion differing from said first information portion with different transmission rates that can be used with time division, said first and second modulation method being used to transmit serially, said first information portion and said second information portion being divided from an image data, and a total transmission time which is the total time available for transmission;
  modulation means, which modulates image data based on said modulation methods;
  wireless transmission/reception means, which outputs signals modulated by the specified modulation method, and which receives transmitted wireless signals;
  demodulation means, which receives signals received by the wireless transmission/reception means, and demodulates said received signals using a modulation method specified by said communication control means;
  image encoding means, which is an image encoding means to encode input image data and generate a bitstream, and which, based on said first information modulation method, said second information modulation method, and said total transmission time specified by said communication control means, controls the amount of encoding upon encoding control in the next total transmission interval as the sum of the time required for transmission of the first information portion and the time required for transmission of the second information portion is essentially constant over more than one interval, based on the number of bits of encoded data which could not be transmitted during said total transmission time among the encoded data of said first information portion data modulated by said first modulation method and said second information portion data modulated by said second modulation method; and
  wherein a ratio of an amount of information in the first information portion to an amount of information in the second information portion changes from a first transmission interval to a second transmission interval.

10. The wireless image transmission system according to claim 9, wherein said image encoding means comprises
  an encoder which encodes said combined image data, and includes quantization means to perform quantization of input data based on a quantization value; and,
  encoding amount control means, which controls the encoding amount of the encoder, and having:
  first information portion counting means, which counts the number of bits of said first information portion;
  second information portion counting means, which counts the number of bits of said second information portion;
  first information portion transmission time computation means, which, based on the number of bits of said first information portion counted by said first information portion counting means, computes the time required to transmit said encoded first information portion by said first modulation method;
  second information portion transmission time computation means, which, based on the time required for transmission of said encoded first information portion and the total transmission time allocated for transmission, computes the time available for transmission of said encoded second information portion;
  second information portion transmittable bits computation means, which, based on the time available for transmission of said encoded second information portion and said second modulation method, computes the number of bits of said second information portion which can be transmitted;
  untransmitted bits computation means, which, based on said number of second information portion transmittable bits and said number of bits of the second information portion counted by the second information portion counting means, computes the number of untransmitted bits exceeding said number of bits of the second information portion which can be transmitted; and,
  quantization value computation means, which, based on said number of untransmitted bits, computes and outputs to said quantization means a quantization value for said second information portion for use in the next image encoding consisting of said number of untransmitted bits of said second information portion, keeping that the sum of the time required for transmission of the first information portion and the time required for transmission of the second information portion required time is essentially constant.

11. An image encoding method, which outputs as an encoded bitstream combined image information including a first information portion, modulated using a first modulation method, and a second information portion, modulated using a second modulation method different from said first modulation method with different transmission rates that can be used with time division, said first and second modulation method being used to transmit serially, said first information portion and said second information portion being divided from an image data; comprising
  an encoding step in which said combined image data is encoded, including quantization processing to perform quantization of input data based on a quantization value, and an encoding amount control step, in which control of the encoding amount in the encoding step is performed, and which has:

a substep, in which the number of bits in said first information portion is counted;

a first information portion transmission time computation step, in which, based on said number of bits of the first information portion counted in said substep to count the number of bits of the first information portion, the time required to transmit said encoded first information portion using said first modulation method is computed;

a second information portion transmission time computation step, in which, based on the time required for transmission of said encoded first information portion and the total transmission time, which is the total time available for transmission, the time available for transmission of said encoded second information portion is computed;

a second information portion transmittable bits computation substep, in which, based on said time available for transmission of the encoded second information portion and said second modulation method, the number of bits of said second information portion which can be transmitted is computed;

a substep in which the number of bits of said second information portion is counted;

an untransmitted bits computation substep, in which, based on said number of second information portion transmittable bits and said number of bits of the second information portion counted by the second information portion counting means, the number of untransmitted bits exceeding said number of transmittable bits of the second information portion is computed;

an quantization value calculation computing substep, in which, based on said number of untransmitted bits, a quantization value for said second information portion for use in the next image encodings consisting of said number of untransmitted bits of said second information portion is computed and output to said quantization means as the time required for transmission of the first information portion and the time required for transmission of the second information portion is essentially constant; and wherein a ratio of an amount of information in the first information portion to an amount of information in the second information portion changes from a first transmission interval to a second transmission interval.

12. An image transmission method, having:

a communication control step, in which a first modulation method which is a modulation used for a first information portion, a second modulation method used for a second information portion different from said first information portion with different transmission rates that can be used with time division, said first information portion and said second information portion being divided from an image data, and a total transmission time which is the total time available for transmission, are specified;

a modulation step, in which image data is modified based on said respective modulation methods;

a wireless transmission/reception step, in which signals modulated in the modulation step are output, and sent signals are received;

a demodulation step, in which signals received in the wireless transmission/reception step are received, and said received signals are demodulated by a modulation method specified in said communication control step;

an image encoding step, which is a means of encoding input image data and generating a bitstream, in which, based on said first modulation method, said second modulation method, and said total transmission time specified by said communication control means, control of the encoding amount is performed in the event of encoding control in the next total transmission interval as the sum of the time required for transmission of the first information portion and the time required for transmission of the second information portion is essentially constant over more than one interval, based on the encoded data that could not be transmitted during said total transmission time among the encoded data of said first information portion data, modulated by said first modulation method, and said second information portion data, modulated by said second modulation method; and wherein a ratio of an amount of information in the first information portion to an amount of information in the second information portion changes from a first transmission interval to a second transmission interval.

13. The image encoding device according to claim 1, wherein said quantization value is calculated that if the cumulatively added value becomes larger than a certain value, in the encoding of the next interval, the amount of encoded data corresponding to the second information portion is reduced and if the cumulatively added value is smaller than a given value, in the encoding of the next interval, the quantization parameter for image encoding is controlled such that the amount of encoded data is increased.

14. The image encoding device according to claim 1, wherein the encoder operates for a plurality of intervals, each interval having a constant transmission time which is the sum of the first and second transmission time.

* * * * *